United States Patent
Shirai et al.

(10) Patent No.: US 10,337,900 B2
(45) Date of Patent: Jul. 2, 2019

(54) THERMAL FLOW METER, TEMPERATURE MEASUREMENT DEVICE, AND THERMAL FLOW METER PROGRAM

(71) Applicant: HORIBA STEC, Co., Ltd., Kyoto-shi, Kyoto (JP)

(72) Inventors: Takashi Shirai, Kyoto (JP); Hiroyuki Okano, Kyoto (JP)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 205 days.

(21) Appl. No.: 14/894,938

(22) PCT Filed: Sep. 8, 2014

(86) PCT No.: PCT/JP2014/073633
§ 371 (c)(1),
(2) Date: Nov. 30, 2015

(87) PCT Pub. No.: WO2015/034081
PCT Pub. Date: Mar. 12, 2015

(65) Prior Publication Data
US 2016/0131512 A1    May 12, 2016

(30) Foreign Application Priority Data

Sep. 9, 2013 (JP) ................................. 2013-185885

(51) Int. Cl.
*G01F 1/696* (2006.01)
*G01F 1/698* (2006.01)
*G01F 1/69* (2006.01)

(52) U.S. Cl.
CPC .............. *G01F 1/6965* (2013.01); *G01F 1/69* (2013.01); *G01F 1/698* (2013.01)

(58) Field of Classification Search
CPC .................................. G01F 1/6965; G01F 1/69
(Continued)

(56) References Cited

U.S. PATENT DOCUMENTS 5,076,099 A * 12/1991 Hisanaga .............. G01F 1/6965
73/1.34
5,703,288 A * 12/1997 Horiguchi ............. G01F 1/6845
73/204.26
(Continued)

FOREIGN PATENT DOCUMENTS

CN    1795369 A    6/2006
CN    102483340 A    5/2012
(Continued)

OTHER PUBLICATIONS

ISA Japanese Patent Office, International Search Report of PCT/JP2014/073633, dated Dec. 9, 2014, WIPO, 2 pages.
(Continued)

*Primary Examiner* — Ricky Ngon
(74) *Attorney, Agent, or Firm* — Alleman Hall Creasman & Tuttle LLP

(57) ABSTRACT

A thermal flow meter is provided that can accurately correct zero point and span errors, which change depending on an ambient temperature, independently of a fluid type. The thermal flow meter includes: a flow path through which measuring target fluid flows; an upstream side electrical resistive element provided on the upstream side of the flow path; a downstream side electrical resistive element provided on the downstream side of the flow path; and a flow rate calculation part that calculates a flow rate of the measuring target fluid on the basis of an upstream side voltage that is a voltage applied to the upstream side electrical resistive element, a downstream side voltage that is a voltage applied to the downstream side electrical resistive element, and the thermal conductivity of the measuring target fluid.

12 Claims, 10 Drawing Sheets

(58) Field of Classification Search
USPC .................................................... 702/69, 47
See application file for complete search history.

(56) References Cited

U.S. PATENT DOCUMENTS

| | | | | |
|---|---|---|---|---|
| 7,467,027 B2* | 12/2008 | Ding | ................... | G05D 7/0635 |
| | | | | 700/282 |
| 2010/0089459 A1* | 4/2010 | Smirnov | ............... | G01F 1/6842 |
| | | | | 137/2 |
| 2013/0160540 A1* | 6/2013 | Okano | ................... | G01F 1/684 |
| | | | | 73/202.5 |
| 2014/0224004 A1* | 8/2014 | Ariyoshi | ................... | G01F 5/00 |
| | | | | 73/114.34 |

FOREIGN PATENT DOCUMENTS

| | | |
|---|---|---|
| CN | 105283737 A | 1/2016 |
| JP | H05149767 A | 6/1993 |
| JP | 2875919 B2 | 3/1999 |
| JP | 2001165731 A | 6/2001 |
| JP | 2003106886 A | 4/2003 |
| JP | 2004085489 A | 3/2004 |

OTHER PUBLICATIONS

Japanese Patent Office, Office Action Issued in Japanese Application No. 2015-535542, dated Aug. 30, 2018, 6 pages. (Submitted with Machine Translation of Office Action).
State Intellectual Property Office of the People's Republic of China, Office Action and Search Report Issued in Application No. 201480031064.6, dated May 29, 2018, 10 pages.

* cited by examiner

THERMAL FLOW METER, TEMPERATURE MEASUREMENT DEVICE, AND THERMAL FLOW METER PROGRAM

TECHNICAL FIELD

The present invention relates to a thermal flow meter that includes two electrical resistive elements in a flow path through which measuring target fluid flows, and measures a flow rate of the measuring target fluid on the basis of a voltage applied in order to heat the electrical resistive elements, and to a program used for the thermal flow meter.

BACKGROUND ART

For example, a thermal flow meter of a constant temperature driving type is configured to control voltages that are to be applied so as to make the temperatures of electrical resistive elements respectively provided on the upstream side and downstream side of a flow path constant, and on the basis of the upstream side voltage and the downstream side voltage at the time, calculate a flow rate of fluid flowing through the flow path. More specifically, as given in Expression 1, the flow rate is obtained from a sensor output that is obtained by dividing a voltage difference, which is the difference between the upstream side voltage and the downstream side voltage, by the sum of the upstream side voltage and the downstream side voltage.

[Expression 1]

$$Q = \text{Sens}((Vu-Vd)/(Vu+Vd)) \quad (1)$$

Here, Q: the flow rate, Sens: an evaluation constant, Vu: the upstream side voltage, Vd: the downstream side voltage, and (Vu−Vd)/(Vu+Vd): the sensor output.

To qualitatively describe Expression 1, (Vu−Vd) has a value that changes depending on the flow rate and temperature of the fluid flowing through the flow path, and (Vu+Vd) has a value that changes almost depending on the temperature, so that ((Vu−Vd)/(Vu+Vd)) is considered to change ideally depending on only the flow rate of the fluid.

Meanwhile, in practice, the effects of the type of measuring target fluid, an ambient temperature, the temperature of the fluid, and the like cause a zero point error or a span error in the flow rate calculated in accordance with Expression 1.

For example, even in a state where the fluid does not flow, when the ambient temperature changes, a zero point output of (Vu−Vd) changes, and the flow rate Q calculated in accordance with Expression 1 does not become zero.

For this reason, as disclosed in PTL 1 or the like, there is a flow meter in which a zero point correction function M including (Vu+Vd) as a temperature index is defined, and when fluid does not flow, a value of [((Vu−Vd)/(Vu+Vd))−M] is made zero independently of an ambient temperature to make a zero point correction.

However, the temperature index (Vu+Vd) used as a variable of the zero point correction function M has a linear characteristic only in some temperature band, and therefore even in the case of using the zero point correction method disclosed in PTL1, the zero point correction can be sufficiently made only in a range of 15° C. to 35° C., failing in the zero point correction in a wider temperature band such as a range of 15° C. to 60° C.

Also, the zero point correction function M is affected by a fluid type, and therefore different for each fluid type. Accordingly, it is necessary to preliminarily determine the zero point correction function M for each measuring target fluid type, taking time and effort very much for actual measurement. In other words, in the past, the relationship between the zero point correction function M and a fluid type has not been well known, and therefore an accurate correction has not been able to be made without doing work such as accurately determining the zero point correction function M for each type.

Such a problem may also occur when making a span correction of a flow rate calculated in accordance with Expression 1 or the like.

CITATION LIST

Patent Literature

Patent Literature: Japanese Patent No. 2875919

SUMMARY OF INVENTION

Technical Problem

The present invention is made in consideration of the problems as described above, and intends to provide a thermal flow meter and thermal flow meter program that can correct a zero point error or a span error, which changes depending on an ambient temperature, more accurately than before, and independently of a fluid type, easily calculate a correction amount used for the correction in accordance with a common calculation expression to reduce time, effort, and the like for determination.

Solution to Problem

That is, the thermal flow meter of the present invention includes: a flow path through which measuring target fluid flows; an upstream side electrical resistive element provided on an upstream side of the flow path; a downstream side electrical resistive element provided on a downstream side of the flow path; and a flow rate calculation part that calculates a flow rate of the measuring target fluid on the basis of an upstream side voltage that is a voltage applied to the upstream side electrical resistive element, a downstream side voltage that is a voltage applied to the downstream side electrical resistive element, and the thermal conductivity of the measuring target fluid.

In addition, the present invention has been made by the present inventors who have first found as a result of intensive examination that a zero point error or a span error in a thermal flow meter is actually closely related to the thermal conductivity of a measuring target, and by using the thermal conductivity as a parameter as well, the accuracy of an outputted flow rate can be increased as compared with before.

Such a configuration makes it possible to bring an outputted flow rate to a value closer to an actual flow rate than before because the thermal conductivity of fluid closely related to a zero point error or a span error is used to output the flow rate.

Also, even in the case where a fluid type is different, by using thermal conductivity, a correction amount corresponding to a zero point error or a span error that change due to a change in ambient temperature or the like can be calculated in accordance with a common operational expression. As a result, time and effort for preliminarily determining a correction amount in order to reduce a zero point error or a span error can be reduced as compared with before.

In order to make it possible to achieve accurate zero point correction by using thermal conductivity, it is only necessary that the flow rate calculation part includes: a sensor output calculation part that calculates a sensor output, which is correlated with the flow rate of the measuring target fluid, on the basis of a voltage difference that is the difference between the upstream side voltage and the downstream side voltage; a zero point correction amount calculation part that calculates a zero point correction amount of the sensor output on the basis of the thermal conductivity of the measuring target fluid; and a correction calculation part that calculates a corrected flow rate on the basis of at least the sensor output and the zero point correction amount.

Specific configurations for, even in the case where ambient temperature changes in a wide temperature band, when fluid stops, making a flow rate outputted from the thermal flow meter zero include a configuration in which the zero point correction amount calculation part includes: a zero point correction temperature function storage part that stores a zero point correction temperature function that is a function of temperature and determined such that the difference from the sensor output becomes zero in a predetermined temperature range when the measuring target fluid does not flow through the flow path; a post-correction temperature index calculation part that calculates a post-correction temperature index on the basis of at least a pre-correction temperature index calculated from the upstream side voltage and the downstream side voltage, and a correction constant calculated from the thermal conductivity of the measuring target fluid; a current temperature calculation part that calculates a current temperature from the post-correction temperature index; and a zero point correction amount determination part that determines the zero point correction amount from the zero point correction temperature function and the current temperature. In such a configuration, from the correction constant calculated from the thermal conductivity, the post-correction temperature index that changes in substantial proportion to a change in ambient temperature can be calculated, and therefore the zero point correction amount appropriate for an actual state can be obtained from the zero point correction temperature function in a state where an ambient temperature is accurately grasped. Accordingly, without providing a thermometer, an accurate zero point correction can be made only from data obtained by the thermal flow meter to increase the accuracy of the outputted flow rate.

In order to make it possible to obtain the correction constant from a calculation expression as long as thermal conductivity is known independently of a fluid type, and eliminate the need to perform a correction constant determination experiment every time, for example, a fluid type is changed, it is only necessary that the correction constant has a value that is calculated on the basis of the square of the reciprocal of the thermal conductivity.

In order to make it possible to make the pre-correction temperature index exhibit a good linear characteristic in a wide temperature band when ambient temperature changes, and obtain a correction amount appropriate for a current state from an accurate temperature in accordance with the zero point correction temperature function, it is only necessary that the pre-correction temperature index is the square of the sum of the upstream side voltage and the downstream side voltage, or the sum of the square of the upstream side voltage and the square of the downstream side voltage.

In order to make it possible to make the correction constant reflect not only an ambient temperature but also the effect of the flow rate of the fluid actually flowing, and obtain a zero point correction amount more appropriate for an actual state, it is only necessary that the post-correction temperature index calculation part calculates the post-correction temperature index on the basis of the pre-correction temperature index, the correction constant, and the sensor output.

In order to output a flow rate in which a zero point error is substantially constantly corrected without the effect of an ambient temperature, an actual flow rate, a fluid type, or the like, it is only necessary that the flow rate calculation part is one that outputs the flow rate of the measuring target fluid on the basis of Expression 2 below.

[Expression 2]

$$G(t) = \{(Vu-Vd)/(Vu+Vd) - F(t)\}$$

$$F(t) = at^3 + bt^2 + ct + d$$

$$t = (Y-f)/e$$

$$Y = (Vu+Vd)^2/(1+K(K-1)*SET^2) \quad (2)$$

Here, t: temperature, G(t): a flow rate temperature function, Vu: the upstream side voltage, Vd: the downstream side voltage, (Vu−Vd)/(Vu+Vd): the sensor output, F(t): the zero point correction temperature function, a, b, c, and d: respective coefficients of the zero point correction temperature function, Y: the post-correction temperature index, e and f: a slope and an intercept when the post-correction temperature index is expressed as a linear expression of temperature, $(Vu+Vd)^2$: the pre-correction temperature index, K: the correction constant, SET: a ratio of the sensor output to the full scale.

In order to make it possible to also accurately correct a span error that changes as ambient temperature changes, it is only necessary that the thermal flow meter further includes a span correction amount calculation part that calculates a span correction amount of the sensor output on the basis of the thermal conductivity of the measuring target fluid, and the correction calculation part is configured to calculate the flow rate corrected on the basis of at least the sensor output and the span correction amount.

In order to make it possible to, of the span error, accurately correct both a component occurring due to only a change in ambient temperature and a component occurring due to characteristics of the measuring target fluid, and increase the accuracy of the flow rate, it is only necessary that the span correction amount is configured to include: a common span correction component that changes depending on only temperature; and a fluid-specific span correction amount that changes depending on at least the thermal conductivity of the measuring target fluid.

In order to make it possible to accurately make a span correction for each measuring target fluid type, it is only necessary that the fluid-specific span correction component is defined as a function using the thermal conductivity, the sensor output, and temperature as variables.

In order to make it possible to correct an effect on the flow rate caused by the structure or the like of the flow path through which the measuring target fluid flows, it is only necessary that the flow path includes: a bypass flow path through which the measuring target fluid flows, which includes a fluid resistive element; and a sensor flow path that is provided to the bypass flow path so as to connect between the front and back of the fluid resistive element and provided with the upstream side electrical resistive element and the downstream side electrical resistive element on an outer side, and the span correction amount further includes a bypass span correction component for making a correction corresponding to the bypass flow path, in which the bypass span correction component is given by a function using at least the thermal conductivity of the measuring target fluid as a variable.

It is only necessary that the flow rate calculation part outputs the flow rate of the measuring target fluid on the basis of Expression 3 below as a specific expression for making it possible to accurately correct the span error that changes depending on an ambient temperature, an actual flow rate, or a fluid type.

[Expression 3]

$$G(t)=S\{(Vu-Vd)/(Vu+Vd)-F(t)\}$$

$$F(t)=at^3+bt^2+ct+d$$

$$t=(Y-f)/e$$

$$Y=(Vu+Vd)^2/(1+K(K-1)* \text{SET}^2)$$

$$S=h(t)+i(\lambda, t, \text{SET})+j(\lambda, t) \qquad (3)$$

Here, t: temperature, G(t): the flow rate temperature function, Vu: the upstream side voltage, Vd: the downstream side voltage, (Vu−Vd) / (Vu+Vd): the sensor output, F(t): the zero point correction temperature function, a, b, c, and d: the respective coefficients of the zero point correction temperature function, Y: the post-correction temperature index, e and f: the slope and the intercept when the post-correction temperature index is expressed by a linear expression of temperature, (Vu+Vd)2: the pre-correction temperature index, K: the correction constant, SET: the ratio of the sensor output to the full scale (a ratio of a pre-correction flow rate value to the full scale), S: the span correction amount, h(t): the function representing the common span correction component, i(λ, t, SET): the function representing the fluid-specific span correction component, and j(λ, t): the function representing the bypass span correction component.

In order to make it possible to calculate the current temperature of the fluid from the upstream side voltage and the downstream side voltage, as well as increasing the accuracy of the current temperature calculated from the thermal conductivity of the measuring target fluid, it is only necessary for a temperature measurement device to include: a flow path through which measuring target fluid flows; an upstream side electrical resistive element provided on an upstream side of the flow path; a downstream side electrical resistive element provided on a downstream side of the flow path; a post-correction temperature index calculation part that calculates a post-correction temperature index on the basis of at least a pre-correction temperature index calculated from an upstream side voltage that is a voltage applied to the upstream side electrical resistive element and a downstream side voltage that is a voltage applied to the downstream side electrical resistive element, and a correction constant calculated from the thermal conductivity of the measuring target fluid; and a current temperature calculation part that calculates a current temperature from the post-correction temperature index.

In order to make it possible to, in an existing thermal flow meter, update a program for calculating a flow rate, and output a flow rate of which a zero point error and a span error are made smaller than at present, it is only necessary to use a thermal flow meter program that is used for a thermal flow meter including a flow path through which measuring target fluid flows, an upstream side electrical resistive element provided on an upstream side of the flow path, and a downstream side electrical resistive element provided on a downstream side of the flow path, and instructs a computer to fulfill a function as a flow rate calculation part that calculates a flow rate of the measuring target fluid on the basis of an upstream side voltage that is a voltage applied in order to make the upstream side electrical resistive element generate heat, a downstream side voltage that is a voltage applied in order to make the downstream side electrical resistive element generate heat, and the thermal conductivity of the measuring target fluid. For example, when updating the program, a thermal flow meter program medium that is a recording medium recorded with the thermal flow meter program, such as a CD, DVD, or flash memory may be used.

Advantageous Effects of Invention

As described, since the thermal flow meter of the present invention is configured to output the flow rate on the basis of the upstream side voltage, the downstream side voltage, and the thermal conductivity of the measuring target, the zero point error or span error related to the thermal conductivity can be accurately corrected to output a value close to an actual flow rate. Also, on the basis of the thermal conductivity and the predetermined calculation expressions, the correction amount appropriate for the type of the measuring target fluid can be calculated, and therefore it becomes possible to, for example, partially omit an experiment for determining parameters necessary to produce the correction amount.

REFERENCE SIGNS LIST

Figure 1:
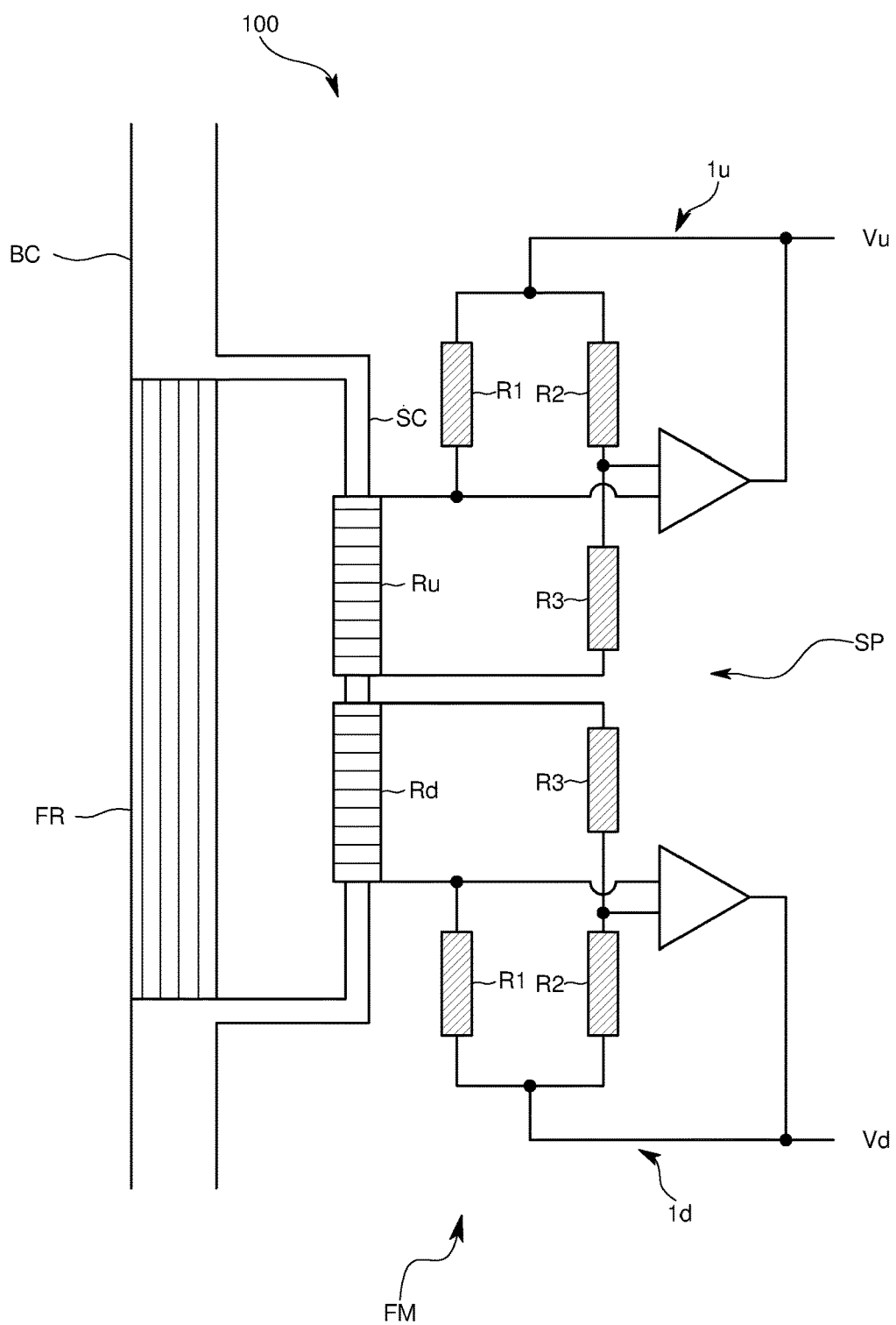
FIG. 1 is a schematic diagram illustrating a sensor part of a thermal flow meter according to one embodiment of the present invention.

100 Thermal flow meter
1u Upstream side electrical resistive element

1*d* Downstream side electrical resistive element
2 Flow rate calculation part
3 Sensor output calculation part
4 Zero point correction amount calculation part
41 Zero point correction temperature function storage part
42 Post-correction temperature index calculation part
43 Current temperature calculation part
44 Zero point correction amount determination part
5 Span correction amount calculation part
51 Span correction function storage part
52 Span correction amount determination part
6 Correction calculation part

DESCRIPTION OF EMBODIMENTS

A thermal flow meter 100 in the present embodiment is described with reference to each drawing.

The thermal flow meter in the present embodiment is one that is used to, in a non-contact manner, measure a flow rate of gas used for, for example, a semiconductor manufacturing process. Gases used in this case include various types of gases such as corrosive gases (such as $BCl_2$, $Cl_2$, HCl, and $ClF_3$), reactive gases (such as $SiH_4$ and $B_2H_6$), and inert gases (such as $N_2$ and He).

More specifically, the thermal flow meter 100 is one that, as illustrated in a schematic diagram of FIG. 1, includes: a bypass flow path BC through which gas as fluid flows; a sensor flow path SC that is a narrow tube branching from the bypass flow path BC, through which the gas branched from the bypass flow path BC flows; a flow rate measuring mechanism FM for measuring a flow rate on the basis of the gas flowing through the sensor flow path SC; and a laminar flow element FR that is provided between a branching point and a meeting point of the branching flow path in the bypass flow path BC and as a fluid resistor having multiple internal flow paths. In addition, the laminar flow element FR is configured to make a flow dividing ratio between the bypass flow path BC and the sensor flow path SC equal to a predetermined design value, and as the laminar flow element FR, for example, one formed by inserting multiple narrow tubes into an outer tube, or one formed by stacking multiple thin flat plates having many through-holes can be used.

The sensor flow path SC is formed of a substantially U-shaped hollow narrow tube, and the narrow tube is made of metal such as stainless steel. On a linear part corresponding to the bottom part of the U-shaped narrow tube, two electrical resistive elements of the flow rate measuring mechanism FM are wound.

The flow rate measuring mechanism FM is configured to include: a sensor part SP that gives an output corresponding to a flow rate of the gas flowing through the sensor flow path SC; and a flow rate calculation part 2 that on the basis of the output from the sensor part SP, calculates mass flow rates of the gas flowing through the sensor flow path SC and the bypass flow path BC.

The sensor part SP includes: an upstream side electrical resistive element Ru that is a coil wound on the outer surface of the narrow tube on the upstream side of the sensor flow path SC; and a downstream side electrical resistive element Rd that is a coil wound on the outer surface of the narrow tube on the downstream side of the sensor flow path SC. Each of the upstream side electrical resistive element Ru and the downstream side electrical resistive element Rd is formed of a heat generating resistance wire of which an electrical resistance value increases/decreases as temperature changes, and adapted to, as one member, serve both as heating means and temperature detecting means.

Further, the sensor part SP is of a constant temperature type, in which a bridge circuit including the upstream side electrical resistive element Ru as a part constitutes an upstream side constant temperature control circuit 1*u*, and also a bridge circuit including the downstream side electrical resistive element Rd as a part constitutes a downstream side constant temperature control circuit 1*d*.

The upstream side constant temperature control circuit 1*u* includes: the upstream side bridge circuit formed by parallel connecting a series resistor group including the upstream side electrical resistive element Ru and a temperature setting resistor R1 connected in series with the upstream side electrical resistive element Ru, and a series resistor group including two fixed resistors R2 and R3 connected in series; and a feedback control circuit that includes an operational amplifier adapted to feed the difference (Vu) in potential between the connecting point between the upstream side electrical resistive element Ru and the temperature setting resistor R1 and the connecting point between the two fixed resistors back to the upstream side bridge circuit to balance the upstream side bridge circuit.

As with the upstream side constant temperature control circuit 1*u*, the downstream side constant temperature control circuit 1*d* also includes: the downstream side bridge circuit formed by parallel connecting a series resistor group including the downstream side electrical resistive element Rd and a temperature setting resistor R1 connected in series with the downstream side electrical resistive element Rd, and a series resistor group including two fixed resistors R2 and R3 connected in series; and a feedback control circuit that includes an operational amplifier adapted to feed the difference (Vd) in potential between the connecting point between the downstream side electrical resistive element Rd and the temperature setting resistor R1 and the connecting point between the two fixed resistors back to the downstream side bridge circuit to balance the downstream side bridge circuit.

Note that the upstream side electrical resistive element Ru and the downstream side electrical resistive element Rd are heat sensitive resistive bodies, and configured using materials having the same temperature coefficient of resistance. In addition, the upstream side electrical resistive element Ru and the downstream side electrical resistive element Rd are feedback-controlled so as to have the same resistance values as those of the temperature setting resistors R1 by the respective feedback control circuits. That is, since the resistance values are kept constant, the voltages Vu and Vd are controlled such that the temperatures of the upstream side electrical resistive element Ru and the downstream side electrical resistive element Rd are also kept constant. In the present embodiment, Vu and Vd are respectively used as the upstream side voltage Vu and the downstream side voltage Vd that are voltages to be applied in order to make the upstream side electrical resistive element Ru and the downstream side electrical resistive element Rd generate heat.

The flow rate calculation part 2 is one that calculates the flow rates of the measuring target gas flowing through the sensor flow path SC and the bypass flow path BC on the basis of values of the upstream side voltage Vu, which is a voltage applied in order to make the upstream side electrical resistive element Ru generate heat, and the downstream side voltage Vd, which is a voltage applied in order to make the downstream side electrical resistive element Rd generate heat, and a value of the thermal conductivity of the measuring target fluid.

In addition, a so-called computer including a memory, a CPU, input/output means, an A/D converter, a D/A converter, and the like executes a thermal flow meter 100 program stored in the memory, and thereby the flow rate calculation part 2 realizes its functions. More specifically, the flow rate calculation part 2 calculates a flow rate on the basis of Expression 4 below.

[Expression 4]

$$G(t)=S\{(Vu-Vd)/(Vu+Vd)-F(t)\}$$

$$F(t)=at^3+bt^2+ct+d$$

$$t=(Y-f)/e$$

$$Y=(Vu+Vd)^2/(1+K(K-1)*SET^2)$$

$$S=h(t)+i(\lambda,t,SET)+j(\lambda,t) \quad (4)$$

Here, t: temperature, G(t): a flow rate temperature function, Vu: the upstream side voltage, Vd: the downstream side voltage, (Vu−Vd)/(Vu+Vd): the sensor output, F(t): a zero point correction temperature function, a, b, c, and d: respective coefficients of the zero point correction temperature function, Y: A post-correction temperature index, e and f: a slope and an intercept when the post-correction temperature index is expressed as a linear expression of temperature, (Vu+Vd)$^2$: a pre-correction temperature index, K: a correction constant, λ: the thermal conductivity of the measuring target fluid, SET: a ratio of the sensor output to the full scale (a ratio of a pre-correction flow rate value to the full scale), S: a span correction amount, h(t): a function representing a common span correction component, i(t, λ, SET): a function representing a fluid-specific span correction component, and j(λ, t): a function representing a bypass span correction component.

Figure 2:
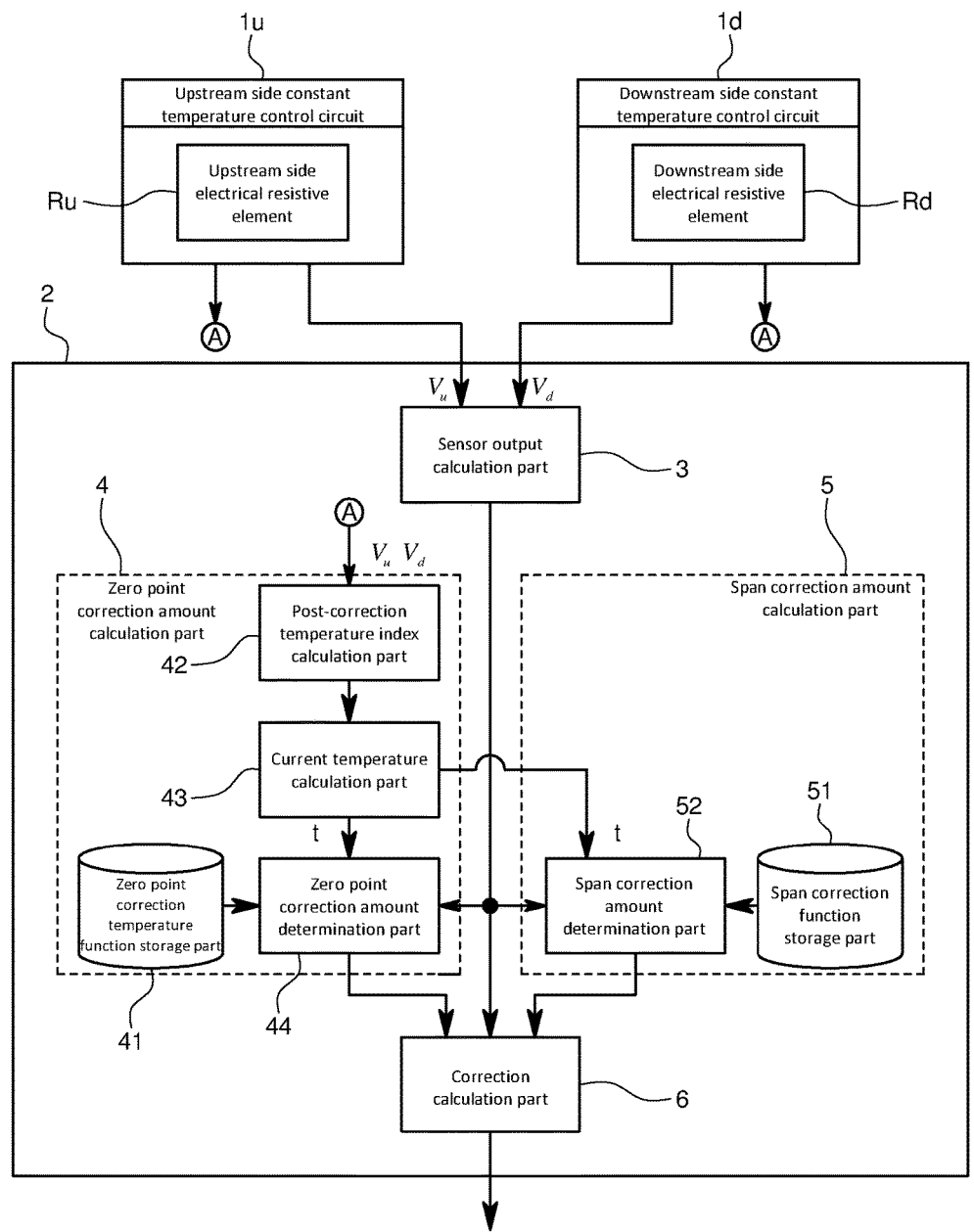
FIG. 2 is a functional block diagram illustrating an operating mechanism of the thermal flow meter in the same embodiment.

Further, the flow rate calculation part 2 is configured to realize functions as at least a sensor output calculation part 3, zero point correction amount calculation part 4, span correction amount calculation part 5, and correction calculation part 6 as illustrated in a functional block diagram of FIG. 2 in order to perform an operation in accordance with Expression 4 above.

The respective parts are described.

The sensor output calculation part 3 is configured to, on the basis of a voltage difference that is the difference between the upstream side voltage Vu and the downstream side voltage Vd, calculate the sensor output correlated with the flow rate of the measuring target fluid. More specifically, the sensor output Vc is calculated on the basis of Expression 5 below.

[Expression 5]

$$V_C = \frac{Vu - Vd}{Vu + Vd} \quad (5)$$

The zero point correction amount calculation part 4 is one that calculates a zero point correction amount of the sensor output on the basis of the thermal conductivity of the measuring target fluid, and the zero point correction amount is calculated by solving Expressions 6, 7, and 8 below.

[Expression 6]

$$F(t)=at^3+bt^2+ct+d \quad (6)$$

[Expression 7]

$$t=(Y-f)/e \quad (7)$$

[Expression 8]

$$Y=(Vu+Vd)^2/(1+K(K-1)*SET^2) \quad (8)$$

That is, as expressed in Expression 6, the zero point correction amount is expressed as a cubic expression using ambient temperature as a variable. Also, the zero point correction amount at each ambient temperature can be obtained by converting the post-correction temperature index calculated from the upstream side voltage Vu and the downstream side voltage Vd in accordance with Expression 8 into an ambient temperature in accordance with Expression 7, and substituting the ambient temperature into Expression 6.

Next, the detail of the zero point correction amount calculation part 4 is described.

The zero point correction amount calculation part 4 is configured to include a zero point correction temperature function storage part 41, post-correction temperature index calculation part 42, current temperature calculation part 43, and zero point correction amount determination part 44.

The zero point correction temperature function storage part 41 stores the zero point correction temperature function that is determined so as to, when the measuring target fluid does not flow through the flow path, make the difference from the sensor output constantly zero in a predetermined temperature range such as a range of 15° C. to 60° C. and a function of temperature expressed by Expression 6. More specifically, the zero point correction temperature function storage part 41 stores the respective coefficients a, b, c, and d of the cubic expression given by Expression 6. The respective coefficients of Expression 6 are experimentally determined such that in the case of changing the temperature within the predetermined temperature range when the fluid is not flowed through the flow path, the same value as the sensor output is constantly obtained.

Figure 3:
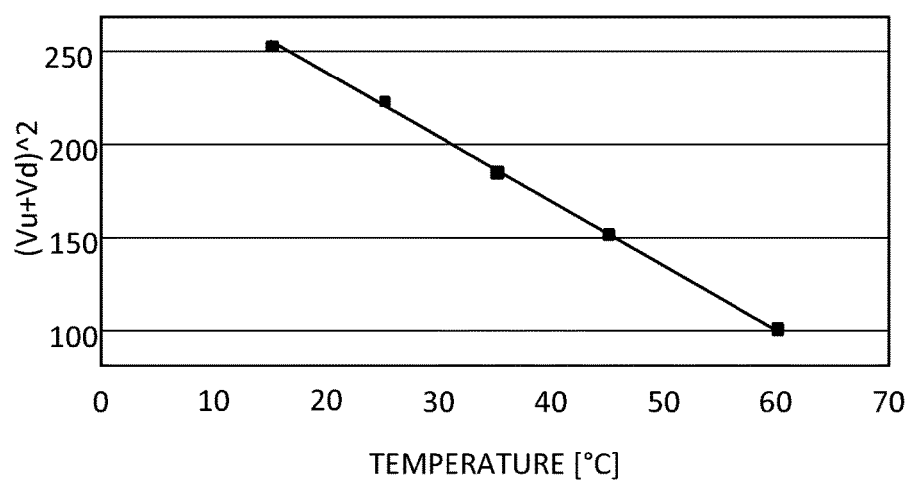
FIG. 3 is a graph of actual measured data representing the relationship between a pre-correction temperature index and ambient temperature.

The post-correction temperature index calculation part 42 is one that calculates the post-correction temperature index on the basis of the pre-correction temperature index calculated from the upstream side voltage Vu and the downstream side voltage Vd, the correction constant K calculated from the thermal conductivity of the measuring target fluid, and a current sensor output. In the present embodiment, as the pre-correction temperature index, the square of the sum of the upstream side voltage Vu and the downstream side voltage Vd is used as expressed in Expression 8. The pre-correction temperature index has a good linear characteristic with respect to temperature as compared with the sum of the upstream side voltage Vu and the downstream side voltage Vd, which is conventionally used, and as actual measured data in FIG. 3 shows, when the ambient temperature is at least within the temperature band of 15° C. to 60° C., a calibration curve representing the relationship between the pre-correction temperature index and the ambient temperature can be expressed as a linear expression.

Figure 4A:
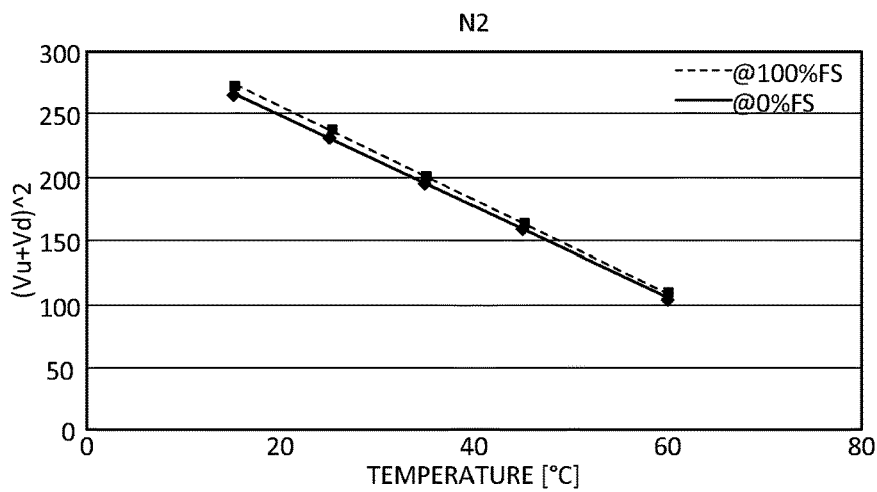
FIGS. 4(a) to 4(c) includes a graph illustrating the effect of a flow rate on the relationship between the pre-correction temperature index and ambient temperature for each fluid type, and a graph illustrating the relationship between a change ratio and thermal conductivity obtained from each graph.
Figure 4B:
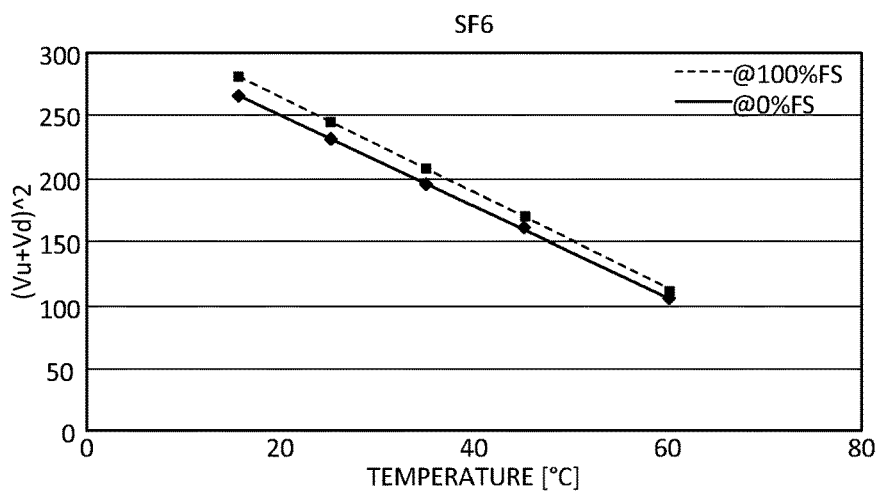

Meanwhile, as illustrated in FIGS. 4(*a*) to 4(*c*), the slope and intercept of the calibration curve change as the type of fluid or a flow rate of the fluid currently flowing through the flow path changes. That is, even in the case of substituting the pre-correction temperature index as Y in Expression 7, a temperature different from a current ambient temperature may be calculated. For this reason, the post-correction temperature index calculation part 42 is adapted to calculate a temperature accurately reflecting a current ambient temperature independently of the type of fluid or a flow rate of the fluid by correcting the pre-correction temperature index as in Expression 8.

First, the effects of the pre-correction temperature index and the ambient temperature on the calibration curve due to the difference in fluid type are described.

Comparing the slope $a_1$ and intercept $b_1$ of a calibration curve in a state where fluid as each gas type does not flow (0% FS) and the slope $a_2$ and intercept $b_2$ of a calibration curve in a state where the fluid flows at a full-scale flow rate (100% FS) with each other results in Table 1 below. In the table, $K_a$ and $K_b$ are change ratios indicating how many times larger or smaller a slope and an intercept are with a state where fluid does not flow as a reference. In addition, calibration curves of pre-correction temperature indices with respect to the ambient temperature measured on $N_2$ and $SF_6$ listed in Table 1 in each of the 0% FS and 100% FS states are illustrated in FIGS. 4(a) and (b). The slopes and intercepts of the respective fluids in Table 1 are obtained by creating approximate straight lines from the measurement results as illustrated in FIGS. 4(a) and (b).

TABLE 1

| Fluid type | Slope $a_1$ | Slope $a_2$ | Change ratio $K_a$ | Intercept $b_1$ | Intercept $b_2$ | Change ratio $K_b$ |
| --- | --- | --- | --- | --- | --- | --- |
| $N_2$ | −3.624 | −3.697 | 1.020 | 321.170 | 329.100 | 1.025 |
| He | −3.567 | −3.570 | 1.001 | 319.130 | 319.970 | 1.003 |
| Ar | −3.592 | −3.729 | 1.038 | 319.260 | 332.740 | 1.042 |
| $SF_6$ | −3.604 | −3.792 | 1.052 | 337.930 | 337.930 | 1.057 |

As can be seen from Table 1, each of the change ratios $K_a$ of the slopes and corresponding one of the change ratios $K_b$ of the intercepts take substantially the same value, and therefore can be represented as a change ratio K without distinction. Although a value of the change ratio K is different depending on each fluid type, as a result of intensive examination by the present inventors, it has been found that the change ratio K takes a value calculable from the thermal conductivity of a corresponding fluid. More specifically, as illustrated in a graph of FIG. 4(c), the change ratio K is given by a linear expression using the square of the reciprocal of thermal conductivity as a variable, and by predetermining the slope and intercept of a calibration line illustrated in the graph of FIG. 4(c), a change ratio K of any fluid in the 100% FS can be calculated from corresponding thermal conductivity.

Figure 5A:
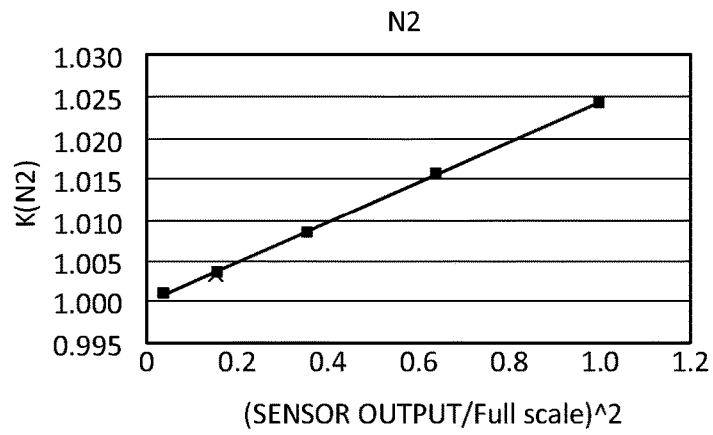
FIGS. 5(a) to 5(c) includes a graph illustrating the effect of a flow rate on the relationship between the change ratio and the flow rate of each fluid type, and a graph illustrating the relationship between the change ratio and the thermal conductivity obtained from each graph.
Figure 5B:
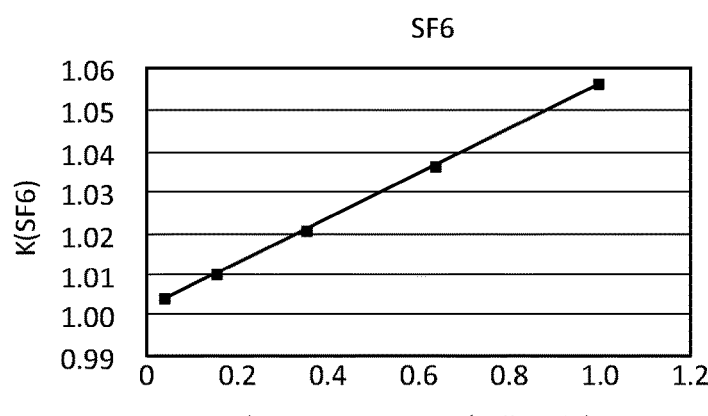

Meanwhile, even in the case of the same fluid type, a change ratio K is affected by a flow rate of that fluid flowing through the flow path and thereby changed. The present inventors has intensively examined results of measuring the relationship between a flow rate and a change ratio K as illustrated in FIG. 5(a) or (b), and thereby first found that the change ratio K can be expressed as a linear expression when the square of the flow rate is used as a variable. In addition, the coefficients of the linear expression are different depending on each gas type, and when using SET that is a ratio of the sensor output to the full scale, obtained as listed in Table 2.

TABLE 2

| Fluid type | Relational expression between change ratio K and SET |
| --- | --- |
| $N_2$ | $K(N_2) = 0.0249 * (SET)^2 + 0.9998$ |
| He | $K(He) = 0.0023 * (SET)^2 + 1.0004$ |
| Ar | $K(Ar) = 0.0416 * (SET)^2 + 1.0010$ |
| $SF_6$ | $K(SF_6) = 0.0556 * (SET)^2 + 0.9996$ |

Figure 5C:
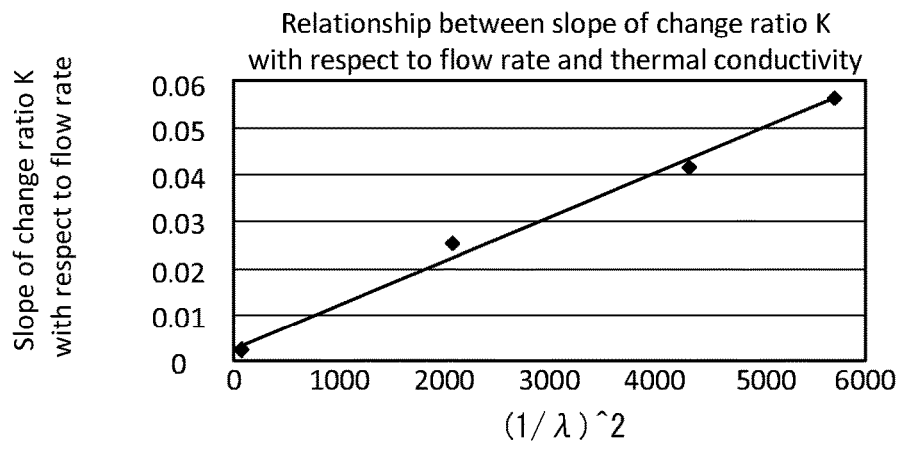

Here, since each change ratio K is based on the state where no fluid flows, when SET is zero, K should be K=1. Accordingly, the respective intercepts in Table 2 may be considered as 1. Also, when focusing on the slope of that change ratio K, which is a coefficient of $(SET)^2$, it turns out that a value of the slope is substantially equal to values obtained by subtracting 1 from corresponding change ratios $K_a$ and $K_b$ in Table 1. Accordingly, each of the coefficients can be expressed as (K−1) using the change ratio K in the 100% FS. Note that the slope of the change ratio K can also be expressed as a linear expression when using the square of the reciprocal of the thermal conductivity of corresponding fluid as a variable as illustrated in the graph of FIG. 5(c). Accordingly, the slope of the change ratio K with respect to the square of a flow rate has also a calculable value as long as the thermal conductivity is known.

As described, the effect of a fluid type on a calibration curve of the pre-correction temperature index with respect to the ambient temperature, and the effect of a flow rate can be respectively expressed using a change ratio K calculated from the thermal conductivity of that fluid. For this reason, the post-correction temperature index calculation part 42 uses the change ratio K as the correction constant K to correct the pre-correction temperature index in terms of each of a fluid type and a flow rate.

More specifically, the post-correction temperature index calculation part 42 corrects the effect caused by the difference in fluid type by dividing the pre-correction temperature index $(Vu+Vd)^2$ by the correction constant K, and also corrects the effect caused by a flow rate by dividing the pre-correction temperature index $(Vu+Vd)^2$ by $[(K-1)*SET^2+1]$.

Then, the current temperature calculation part 43 calculates a current temperature from the post-correction temperature index in accordance with Expression 7. Note that the coefficients f and e used in Expression 7 are predetermined by actual measurement or the like. Further, the coefficients a, b, c, d, e, and f are predetermined on the basis of measured data obtained when a fluid type serving as a reference was flowed, but not determined for each fluid type. When changing a fluid type, by changing the correction constant K used to calculate the post-correction temperature index correspondingly to the thermal conductivity of new fluid and using the changed correction constant K, an accurate ambient temperature can be obtained.

Table 3 shows a comparative example between a value obtained when calculating an ambient temperature in accordance with Expression 7 using a pre-correction temperature index and a value obtained when calculating the ambient temperature in accordance with Expression 7 using a post-correction temperature index calculated in the post-correction temperature index calculation part 42.

| $N_2$ flowing at flow rate of 20% FS | | |
| --- | --- | --- |
| Actual ambient temperature (° C.) | Calculated ambient temperature (° C.) when using pre-correction temperature index | Calculated ambient temperature (° C.) when using post-correction temperature index |
| --- | --- | --- |
| 25 | 24.4 | 24.5 |
| 15 | 15.3 | 15.4 |
| 35 | 35.0 | 35.1 |
| 45 | 44.8 | 44.8 |
| 60 | 60.1 | 60.1 |

| N₂ flowing at flow rate of 60% FS | | |
|---|---|---|
| Actual ambient temperature (° C.) | Calculated ambient temperature (° C.) when using pre-correction temperature index | Calculated ambient temperature (° C.) when using post-correction temperature index |
| 25 | 24.0 | 24.5 |
| 15 | 14.7 | 15.2 |
| 35 | 34.5 | 34.9 |
| 45 | 44.4 | 44.7 |
| 60 | 60.0 | 60.1 |

| SF₆ flowing at flow rate of 20% FS | | |
|---|---|---|
| Actual ambient temperature (° C.) | Calculated ambient temperature (° C.) when using pre-correction temperature index | Calculated ambient temperature (° C.) when using post-correction temperature index |
| 25 | 25.0 | 25.2 |
| 15 | 15.2 | 15.3 |
| 35 | 34.9 | 35.0 |
| 45 | 44.9 | 45.0 |
| 60 | 60.1 | 60.1 |

| SF₆ flowing at flow rate of 60% FS | | |
|---|---|---|
| Actual ambient temperature (° C.) | Calculated ambient temperature (° C.) when using pre-correction temperature index | Calculated ambient temperature (° C.) when using post-correction temperature index |
| 25 | 23.9 | 25.2 |
| 15 | 14.0 | 15.5 |
| 35 | 34.1 | 35.1 |
| 45 | 44.2 | 45.0 |
| 60 | 59.6 | 60.1 |

As can be seen from Table 3, by using the post-correction temperature index, a more accurate ambient temperature than before can be calculated independently of a fluid type or a flow rate.

Figure 6:
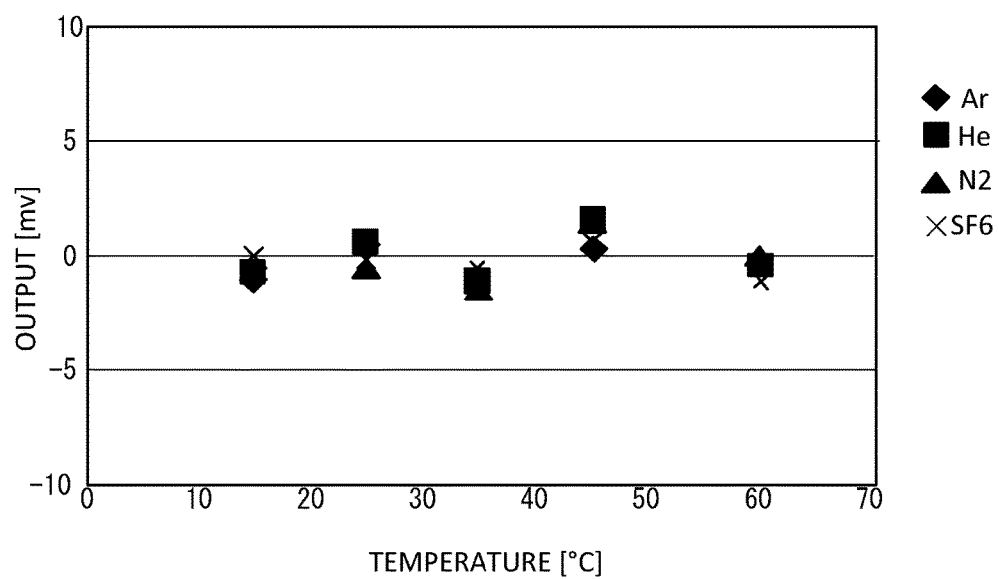
FIG. 6 is a graph illustrating correction results using zero point correction amounts in the present embodiment.

The zero point correction amount determination part 44 is one that determines the zero point correction amount from the zero point correction temperature function and the current temperature. That is, the zero point correction amount determination part 44 substitutes the ambient temperature obtained in accordance with Expressions 7 and 8 into the zero point correction temperature function given by Expression 6 to calculate the zero point correction amount, and sends a value of the zero point correction amount to the correction calculation part 6. Correction results based on zero point correction amounts in the present embodiment are illustrated in a graph of FIG. 6. In a state where no fluid flows, an output can be made substantially zero for any fluid type in a range of 15° C. to 60° C., and a good zero point correction can be made.

Next, the span correction amount calculation part 5 that calculates the span correction amount of the sensor output is described.

The span correction amount calculation part 5 is configured to calculate the span correction amount of the sensor output on the basis of the thermal conductivity of the measuring target fluid as well as using the ambient temperature calculated in the current temperature calculation part 43.

More specifically, the span correction amount calculation part 5 is configured to include: a span correction function storage part 51 that stores a span correction function given by Expression 9 below; and a span correction amount determination part 52 that substitutes the current temperature obtained from the current temperature calculation part 43, the sensor output, and the thermal conductivity of the measuring target fluid into the span correction function to determine the span correction amount.

[Expression 9]

$$S = h(t) + i(\lambda, t, \text{SET}) + j(\lambda, t) \quad (9)$$

Here, S: the span correction amount, h(t): a function representing a common span correction component, i(λ, t, SET): a function representing a fluid-specific span correction component, and j(λ, t): a function representing a bypass span correction component. Also, h(t) and i(λ, t, SET) are functions for correcting a span error caused by the structure of the thermal flow meter itself, and j(λ, t) is a function for correcting a span error caused by the flow path.

Figure 7A:
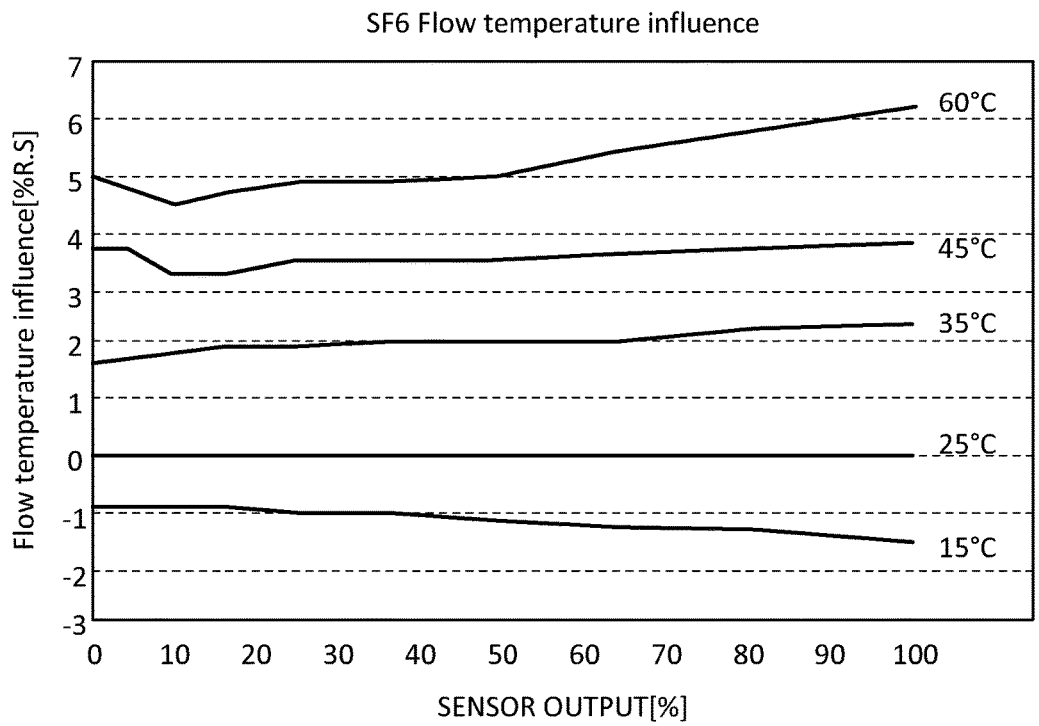
FIGS. 7(a) and 7(b) is a graph illustrating a span error appearing in a conventional thermal flow meter.
Figure 7B:
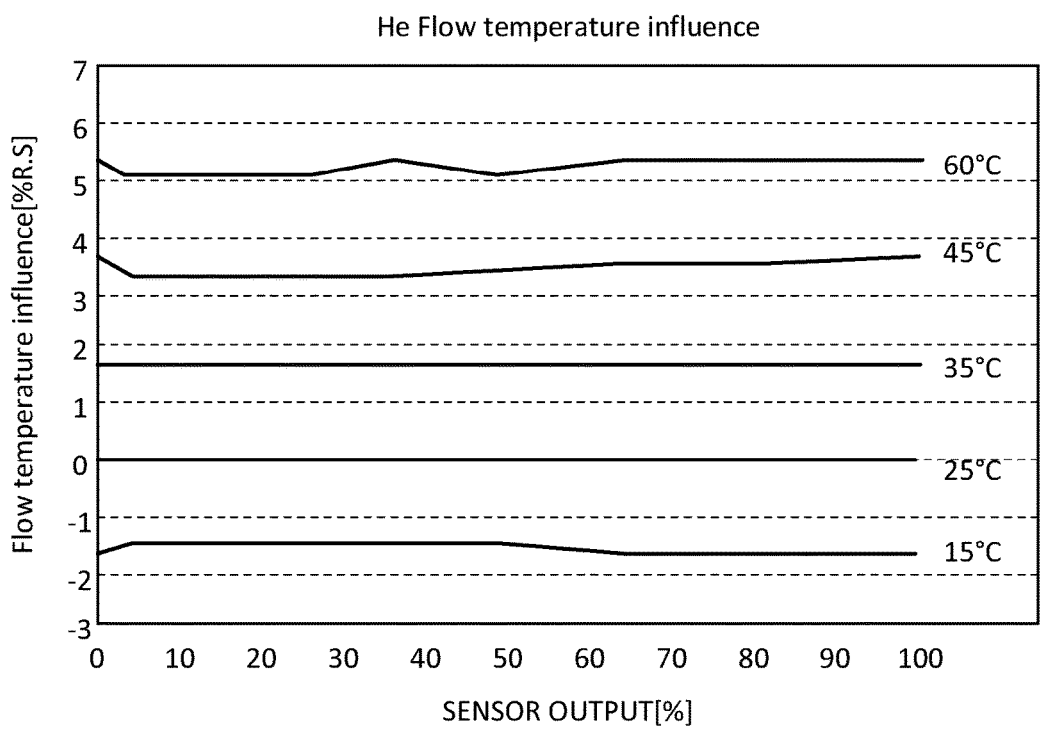

The reason why the span correction amount is defined by the three functions in this manner is described. FIGS. 7(a) and 7(b) is a graph illustrating a span error at each temperature with a flow rate measured at 25° C. as a reference when measuring a flow rate with a conventional thermal flow meter 100. In addition, fluid types are SF6 and He, and separately from the conventional thermal flow meter, a reference flow meter not easily affected by temperature is provided. The span error illustrated in the graph represents an amount by which a value indicated by the conventional thermal flow meter shifts from a value indicated by the reference flow meter.

When comparing FIGS. 7(a) and (b) with each other, it is considered that the span error is configured to include: a common span error that depends on only a substantial ambient temperature, independently of a fluid type or a flow rate and occurs in the form of an offset; and a fluid-specific span error of which a change ratio with respect to a flow rate is different for each fluid type and a value increases as the flow rate increases.

For this reason, the span correction amount is adapted to include at least the common span correction component for correcting the common span error, and the fluid-specific span correction component for correcting the fluid-specific span error.

Referring now to FIG. 7(b), the span error of He is constantly substantially flat at any temperature independently of a flow rate, indicating that only the common span error remarkably appears, and the span error increases correlated with separation from the reference temperature 25° C. For this reason, a linear function of temperature is created from the relationship between the temperature of He and the magnitude of the span error to determine the function h(t) for the common span correction component as in Expression 10 below.

[Expression 10]

$$h(t) = C_1 t + C_2 \quad (10)$$

Here, $C_1$ and $C_2$ are constants determined on the basis of the span error of He.

Next, the fluid-specific span correction component is described.

Figure 8A:
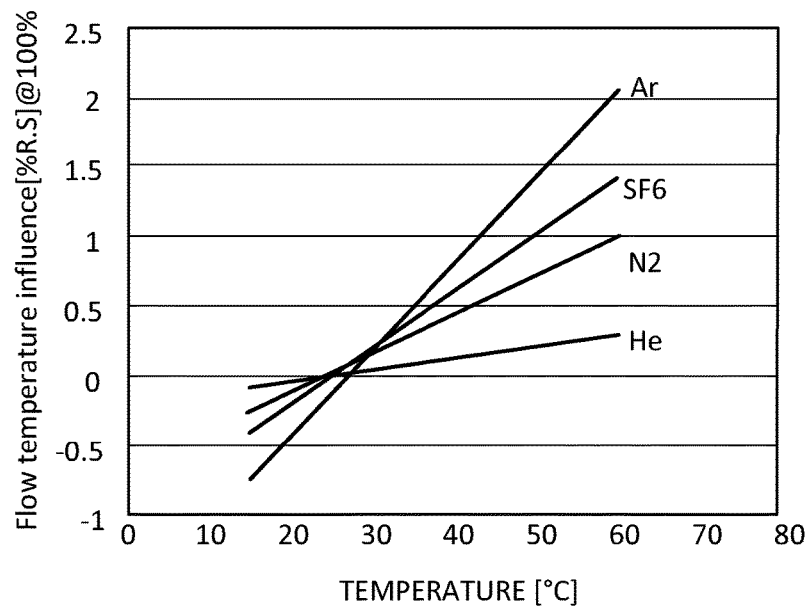
FIGS. 8(a) and 8(b) includes a graph illustrating the slope of a fluid-specific span error with respect to a flow rate, and a graph illustrating the relationship between the slope and the thermal conductivity calculated from that graph.
Figure 8B:
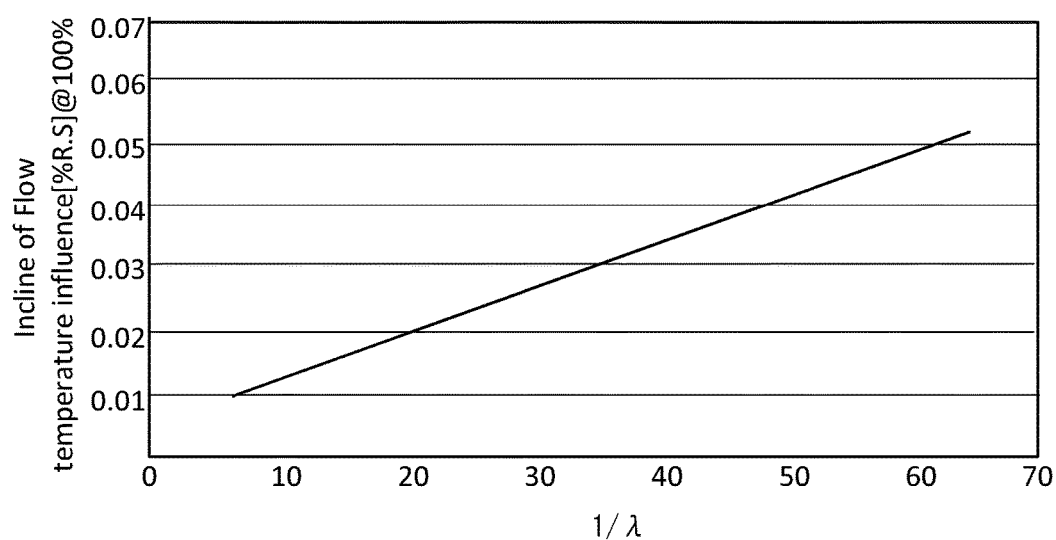

The slope of a fluid-specific span error with respect to ambient temperature in each fluid type is different for each fluid type as can be seen from a graph of a span error with respect to a temperature change at a 100% flow rate in FIG. 8(a). As a result of intensive examination, the present inventor has found that the slope of each straight line can be expressed as a linear expression using the reciprocal of the thermal conductivity of corresponding fluid as a variable as illustrated in FIG. 8(b). For this reason, a function for the fluid-specific span correction component is defined as the function i(λ, t, SET) using temperature, thermal conductivity, and a flow rate as variables.
More specifically, the function i(λ, t, SET) is defined as in Expression 11 below.
[Expression 11]

$$i(\lambda, t, SET) = C_3 * (1/\lambda) * (t + C_4) * SET \quad (11)$$

Here, $C_3$ and $C_4$ are constants determined by actual measurement performed on the reference fluid.

Figure 9A:
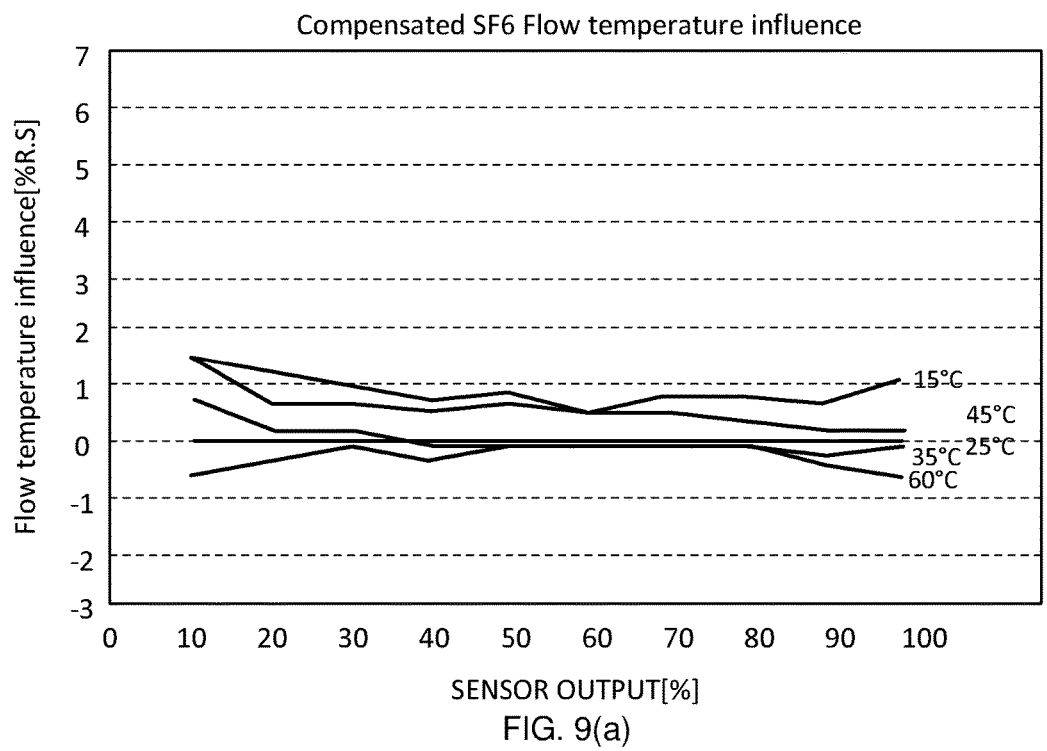
FIGS. 9(a) and 9(b) is a graph illustrating span correction results using only a common span correction component and a fluid-specific span correction component.
Figure 9B:
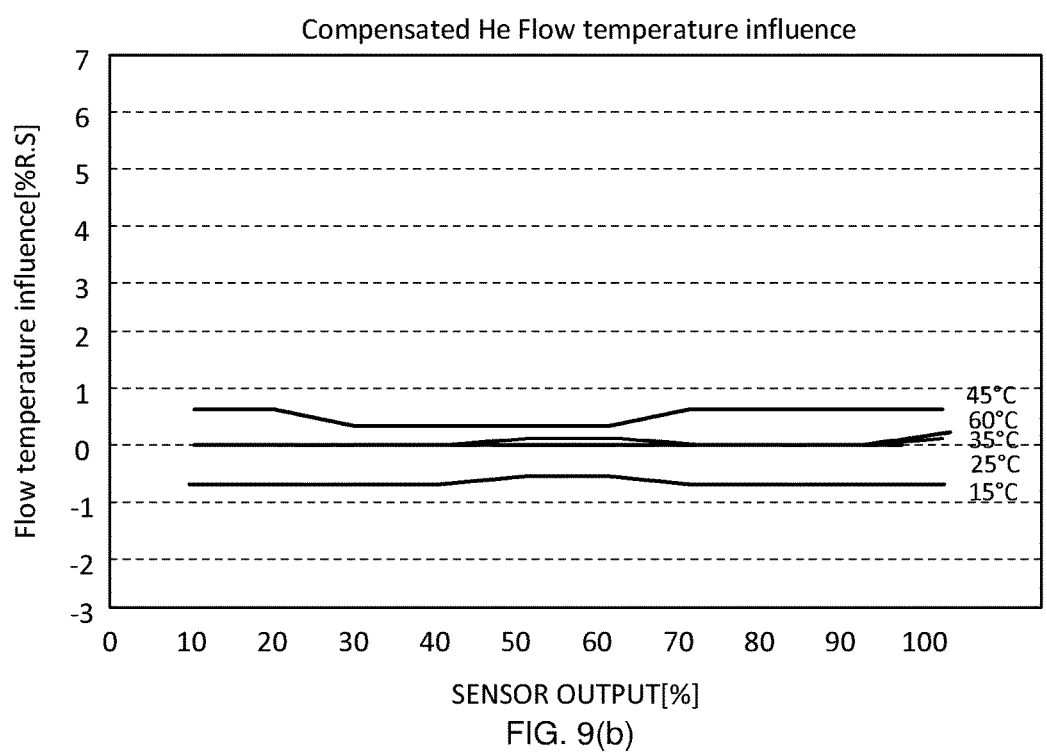

Graphs obtained when correcting the measurement results in FIGS. 7(a) and 7(b) on the basis of the span correction including only the above-described common span correction component and fluid-specific span correction component are illustrated in FIGS. 9(a) and 9(b). As can be seen from FIGS. 9(a) and 9(b), it turns out that independently of a fluid type or a flow rate, the span errors can be corrected.

Next, the case where the span correction amount further includes the bypass span correction component is described. In the span error, the bypass span error affected by the flow dividing ratio between the sensor flow path SC and the bypass flow path BC, and structure are also present. This error is considered to occur because when ambient temperature changes, the viscosity of fluid changes to change the flow dividing ratio between the sensor flow path SC and the bypass flow path BC. For this reason, the function j(λ, t) for the bypass span correction component is defined as in Expression 12 below.
[Expression 12]

$$j(\lambda, t) = C_5 * t + (C_6 t + C_7) * (1/\lambda)^2 + C_8 \quad (12)$$

Here, $C_5$, $C_6$, $C_7$, and $C_8$ are constants determined on the basis of actual measured data obtained when the reference fluid was flowed.

Figure 10:
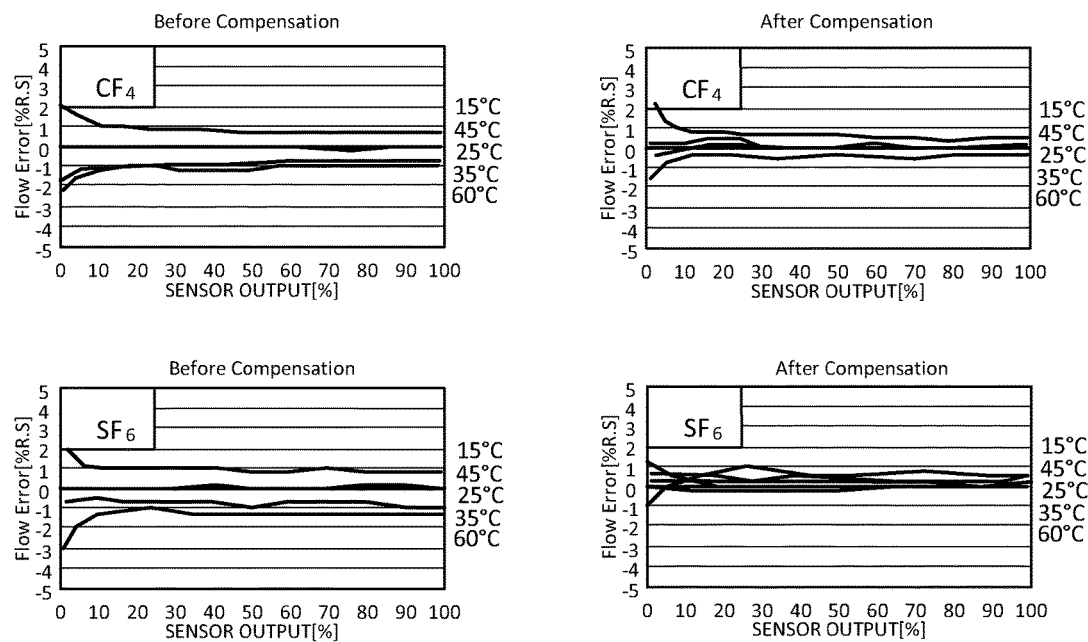
FIG. 10 is a graph illustrating span correction results using a span correction amount including all components.

A comparative example between the case where the span correction amount includes only the common span correction component and the fluid-specific correction component, and the case where the span correction amount further includes the bypass span correction component is illustrated in a graph of FIG. 10. It turns out that independently of a fluid type or temperature, the span error can be further reduced. In addition, in the result of the span correction measurement of SF6 in FIG. 9(a), and the span correction measurement of SF6 in FIG. 10, different thermal flow meters having different flow dividing ratios were used for the measurements, and therefore difference occurs in the span correction result before the correction. However, by adding the bypass span correction component j(λ, t), it can be read from FIG. 10 that the span error can be further reduced.

The reason why correction accuracy is increased by defining the function j(λ, t) for the bypass span correction component as in Expression 12 is quantitatively described. The cause for the change in flow dividing ratio is expected to be that the viscosity of fluid is changed by a change in ambient temperature. Note that the relational expression between viscosity and temperature is given by something like, for example, Expression 13.

[Expression 13]

$$\mu = \frac{2(mk_B t)^{0.5}}{3\pi^{1.5} d^{0.5}} \quad (13)$$

Here, μ: viscosity, m: the mass of one molecule, $k_B$: the Boltzmann constant, and d: the diameter of a gas molecule. On the other hand, the relational expression between thermal conductivity and temperature is given by Expression 14.

[Expression 14]

$$\lambda = \frac{k_B^{1.5} t^{0.5}}{\pi^{1.5} m^{1.5} d^2} \quad (14)$$

When comparing Expression 13 and Expression 14 with each other, the viscosity and the thermal conductivity both have values proportional to the one-half power of temperature, and the dependence on temperature is considered to be quite similar. Accordingly, in the present embodiment, it is considered that by using thermal conductivity in place of using viscosity, a span correction amount for each fluid type can be calculated to make an accurate correction.

Finally, the correction calculation part 6 calculates a corrected flow rate as a final output on the basis of the sensor output, the zero point correction amount, and the span correction amount.

As described, since the thermal flow meter 100 in the present embodiment is configured to calculate the flow rate on the basis of the upstream side voltage Vu, the downstream side voltage Vd, and the thermal conductivity of fluid, it can accurately correct the zero point and span errors, which are changed by the effect of an ambient temperature and a flow rate of the fluid, in a wide temperature band to output a correct flow rate.

Also, without performing any determination experiment for a correction amount for each fluid type in order to calculate the zero point correction amount and the span correction amount, by substituting the thermal conductivity of that fluid type into the common calculation expression, the correction amount can be calculated. Accordingly, even in the case of application using multiple types of fluids flowing through the flow path, it is not necessary to perform an experiment for determining as many dedicated correction amount calculation expressions as the number of the fluid types, and therefore setting work can be reduced.

Other embodiments are described.
The above-described embodiment is one including both the zero point correction amount calculation part and the span correction amount calculation part, but depending on application, may use the zero point correction amount calculation part or the span correction amount calculation part in the present invention independently. For example, in the case of making only the zero point correction, a calculation expression for a flow rate may be defined as in Expression 15.
[Expression 15]

$$G(t) = \{(Vu - Vd)/(Vu + Vd) - F(t)\}$$

$$F(t) = at^3 + bt^2 + ct + d$$

$$t = (Y - f)/e$$

$$Y = (Vu + Vd)^2/(1 + K(K-1) * SET^2) \quad (15)$$

Also, in the case of using the span correction amount calculation part independently, the span correction amount calculation part may be adapted to include the post-correction temperature index calculation part and the current temperature calculation part in its configuration. Further, the span correction amount may be one including only the common span correction component and the fluid-specific span correction component with the bypass span correction component omitted.

The above-described embodiment uses the square of the sum of the upstream side voltage and the downstream side voltage as the temperature index, but may use the sum of the square of the upstream side voltage and the square of the downstream side voltage. Even such an embodiment has a good linear characteristic with respect to temperature in a wide temperature band, and can accurately estimate and calculate a current temperature.

Thermal conductivity used for each fluid type in order to calculate the zero point correction amount and the span correction amount may be preliminarily stored in the memory as a physical property value, or may be calculated on the basis of the upstream side voltage and the downstream side voltage. More specifically, between a ratio between a change in upstream side voltage and a change in downstream side voltage when a flow rate is changed and thermal conductivity, a predetermined relational expression exists, and therefore on the basis of the relational expression, the thermal conductivity of fluid can be calculated from the upstream side voltage and the downstream side voltage.

Also, in the above-described embodiment, an example of applying the present invention to the thermal flow meter of the constant temperature driving type is described; however, the present invention can also be applied to a thermal flow meter of a constant current driving type. More specifically, in the case of the constant current driving type, the thermal flow meter has one bridge circuit including an upstream side electrical resistive element and a downstream side electrical resistive element, and is controlled so as to make currents applied to the respective electrical resistive elements constant. In the case of the constant current driving type, the voltage difference between an upstream side voltage applied to the upstream side electrical resistive element and a downstream side voltage applied to the downstream side electrical resistive element is outputted from the bridge circuit. As described, the only one voltage difference outputted from the bridge circuit exists, and is outputted on the basis of the upstream side voltage and the downstream side voltage, and this point is common to the thermal flow meter of the constant temperature driving type of the present embodiment. Accordingly, the present invention can also be applied to the thermal flow meter of the constant current driving type. In addition, the present invention may be applied to a thermal flow meter of a constant temperature difference driving type that is configured to keep a predetermined temperature difference between an upstream side electrical resistive element and a downstream side electrical resistive element.

Further, the upstream side voltage and the downstream side voltage in the present invention are not limited to the voltages applied in order to generate heat. More specifically, the present invention can also be used for a thermal flow meter that is configured such that a heat generating resistor provided between an upstream side electrical resistive element and a downstream side electrical resistive element generates heat, and the upstream side electrical resistive element and the downstream side electrical resistive element respectively function as temperature sensors, and on the basis of the upstream side voltage and the downstream side voltage applied correspondingly to temperatures, calculates a flow rate.

In addition, the present invention does not only intend to measure a flow rate, but may be configured as a temperature measurement device for measuring a current temperature of a measuring target flow rate. More specifically, the present invention may be configured as a temperature measurement device characterized by including: a flow path through which the measuring target fluid flows; an upstream side electrical resistive element provided on the upstream side of the flow path; a downstream side electrical resistive element provided on the downstream side of the flow path; a post-correction temperature index calculation part that calculates a post-correction temperature index on the basis of at least a pre-correction temperature index calculated from an upstream side voltage, which is a voltage applied to the upstream side electrical resistive element, a downstream side voltage, which is a voltage applied to the downstream side electrical resistive element, and a correction constant calculated from the thermal conductivity of the measuring target fluid; and a current temperature calculation part that calculates a current temperature from the post-correction temperature index. In addition, as another embodiment of this temperature measurement device, an embodiment that omits the current temperature calculation part that calculates the current temperature from the post-correction temperature index is also possible. More specifically, for example, in a case such as the case where a value as Celsius temperature is not required, the post-correction temperature index may be directly treated as a temperature. Even in such an embodiment, the post-correction temperature index is one that reflects an accurate temperature of fluid, and therefore the embodiment can be preferably used for, for example, correction or other application.

Figure 4C:
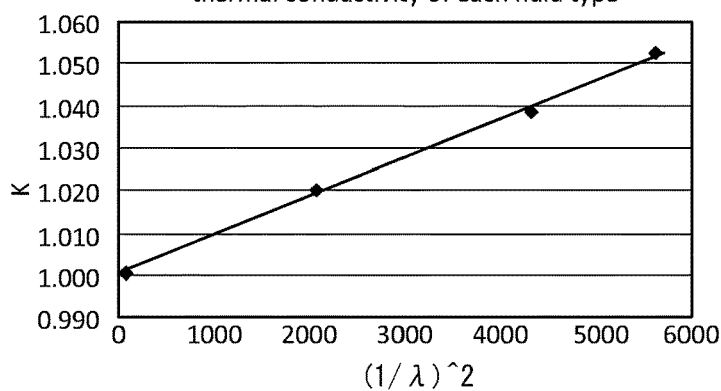

The above-described embodiment is adapted to be able to actually measure the effect of a zero point error due to the difference in fluid type or flow rate, then use the linear expression using thermal conductivity as a variable to approximate the correction constant K from data obtained by the measurement as illustrated in drawings such as FIG. 4(c), and calculate the correction constant K from the thermal conductivity of each fluid. Note that an approximation expression is not limited to the linear expression, but another polynomial expression may be used to perform the approximation. The same holds true for the span correction.

Also, the bypass span error correction component $j(\lambda, t)$ in the above-described embodiment is given by the function of thermal conductivity and temperature, but may use a value related to a current flow rate as a variable so as to be able to correct the effect of a flow rate.

In addition, it is also possible to add the configuration of the present invention to an existing thermal flow meter through a program storage medium that stores a thermal flow meter program used for the thermal flow meter of the present invention, and realize functions of it. As the program storage medium, a CD, DVD, HDD, flash memory, or the like may be used.

Besides, various modifications and combinations of the embodiments may be made without departing from the scope of the present invention.

INDUSTRIAL APPLICABILITY

By using the thermal flow meter of the present invention, a flow rate of a component gas or the like can be accurately measured in a semiconductor manufacturing process to improve the quality of it or the like.

The invention claimed is:
1. A thermal flow meter comprising:
a flow path through which measuring target fluid flows;
an upstream side electrical resistive element provided on an upstream side of the flow path;

a downstream side electrical resistive element provided on a downstream side of the flow path; and a flow rate calculation part executed by a processor that calculates a flow rate of the measuring target fluid independently of a fluid type, on a basis of an upstream side voltage that is a voltage applied to the upstream side electrical resistive element, a downstream side voltage that is a voltage applied to the downstream side electrical resistive element, and thermal conductivity of the measuring target fluid, wherein the flow rate calculation part calculates a pre-correction temperature index on a basis of a sum of the upstream side voltage and the downstream side voltage, the flow rate calculation part calculates a correction constant on a basis of the thermal conductivity of the measuring target fluid, the flow rate calculation part calculates a post-correction temperature index on a basis of the pre-correction temperature index and the correction constant calculated from the thermal conductivity of the measuring target fluid, the flow rate calculation part calculates a current temperature from the post-correction temperature index, the flow rate calculation part determines correction amounts of the flow rate of the measuring target fluid by using the current temperature and, the flow rate calculation part outputs a corrected flow rate which is corrected in comparison to the flow rate of the measuring target fluid before correction amounts are applied.

2. The thermal flow meter according to claim 1, wherein the flow rate calculation part comprises:
   a sensor output calculation part that calculates a sensor output on a basis of a voltage difference that is a difference between the upstream side voltage and the downstream side voltage, the sensor output being correlated with the flow rate of the measuring target fluid;
   a zero point correction amount calculation part that calculates a zero point correction amount of the sensor output on a basis of the thermal conductivity of the measuring target fluid; and
   a correction calculation part that calculates a corrected flow rate on a basis of at least the sensor output and the zero point correction amount.

3. The thermal flow meter according to claim 2, wherein the zero point correction amount calculation part comprises:
   a zero point correction temperature function storage part that stores a zero point correction temperature function that is a function of temperature and determined such that a difference from the sensor output becomes zero in a predetermined temperature range when the measuring target fluid does not flow through the flow path;
   a post-correction temperature index calculation part that calculates the post-correction temperature index on the basis of at least the pre-correction temperature index calculated from the upstream side voltage and the downstream side voltage, and the correction constant calculated from the thermal conductivity of the measuring target fluid;
   a current temperature calculation part that calculates the current temperature from the post-correction temperature index; and
   a zero point correction amount determination part that determines the zero point correction amount from the zero point correction temperature function and the current temperature.

4. The thermal flow meter according to claim 3, wherein the correction constant has a value that is calculated on a basis of a square of a reciprocal of the thermal conductivity.

5. The thermal flow meter according to claim 3, wherein the post-correction temperature index calculation part calculates the post-correction temperature index on a basis of the pre-correction temperature index, the correction constant, and the sensor output.

6. The thermal flow meter according to claim 1, further comprising
   a span correction amount calculation part that calculates a span correction amount of a sensor output on a basis of the thermal conductivity of the measuring target fluid, wherein
   the span correction amount calculation part is configured to calculate a corrected flow rate on a basis of at least the sensor output and the span correction amount.

7. The thermal flow meter according to claim 6, wherein the span correction amount is configured to include: a common span correction component that changes depending on only temperature; and a fluid-specific span correction component that changes depending on at least the thermal conductivity of the measuring target fluid.

8. The thermal flow meter according to claim 7, wherein the fluid-specific span correction component is given by a function using the thermal conductivity, the sensor output, and temperature as variables.

9. The thermal flow meter according to claim 7, wherein the flow path includes:
   a bypass flow path through which the measuring target fluid flows, the bypass flow path including a fluid resistive element; and
   a sensor flow path that is provided so as to connect between a front and a back of the fluid resistive element and provided with the upstream side electrical resistive element and the downstream side electrical resistive element on an outer side, wherein
   the span correction amount further includes a bypass span correction component for making a correction corresponding to the bypass flow path, and the bypass span correction component is given by a function using at least the thermal conductivity of the measuring target fluid as a variable.

10. A temperature measurement device comprising:
    a flow path through which measuring target fluid flows;
    an upstream side electrical resistive element provided on an upstream side of the flow path;
    a downstream side electrical resistive element provided on a downstream side of the flow path;
    a post-correction temperature calculation part that calculates a post-correction temperature index on a basis of at least a pre-correction temperature index calculated from an upstream side voltage that is a voltage applied to the upstream side electrical resistive element and a downstream side voltage that is a voltage applied to the downstream side electrical resistive element, and a correction constant calculated from thermal conductivity of the measuring target fluid; and
    a current temperature calculation part that calculates a current temperature from the post-correction temperature index.

11. A non-transitory computer readable storage medium that stores computer instructions for a thermal flow meter program used for a thermal flow meter comprising a flow path through which measuring target fluid flows, an upstream side electrical resistive element provided on an upstream side of the flow path, and a downstream side electrical resistive element provided on a downstream side of the flow path, wherein the computer instructions for the thermal flow meter program are executed by a computer processor to perform functions of:

a flow rate calculation part that calculates a flow rate of the measuring target fluid on a basis of an upstream side voltage that is a voltage applied to the upstream side electrical resistive element, a downstream side voltage that is a voltage applied to the downstream side electrical resistive element, and thermal conductivity of the measuring target fluid, wherein the flow rate calculation part calculates a post-correction temperature index on a basis of at least a pre-correction temperature index and a correction constant, the pre-correction temperature index being calculated from the upstream side voltage and the downstream side voltage, and the correction constant being calculated from the thermal conductivity of the measuring target fluid, the flow rate calculation part calculates a current temperature from the post-correction temperature index, the flow rate calculation part determines correction amounts of the flow rate of the measuring target fluid by using the current temperature, and the flow rate calculation part outputs a corrected flow rate which is corrected in comparison to the flow rate of the measuring target fluid before correction amounts are applied.

12. A thermal flow meter comprising:

a flow path through which measuring target fluid flows;

an upstream side electrical resistive element provided on an upstream side of the flow path;

a downstream side electrical resistive element provided on a downstream side of the flow path; and a flow rate calculation part that calculates a flow rate of the measuring target fluid, wherein the flow rate calculation part calculates a sensor output on a basis of a voltage difference that is a difference between the upstream side voltage and the downstream side voltage, the sensor output being correlated with the flow rate of the measuring target fluid, the flow rate calculation part calculates a correction constant on a basis of a thermal conductivity of the measuring target fluid, and the flow rate calculation part corrects the flow rate by correcting the sensor output on a basis of the correction constant and determines the flow rate.

\* \* \* \* \*